United States Patent
Liou et al.

(10) Patent No.: US 7,824,074 B2
(45) Date of Patent: Nov. 2, 2010

(54) DISPLAY FOR AN ELECTRONIC DEVICE WITH ADDITIONAL ILLUMNATION FUNCTION

(75) Inventors: Guan-De Liou, Taipei (TW); Stephen Tsai, Sijhih (TW); Li-Li Lai, Taipei (TW)

(73) Assignee: Hannspree, Inc., Taipei (TW)

( * ) Notice: Subject to any disclaimer, the term of this patent is extended or adjusted under 35 U.S.C. 154(b) by 112 days.

(21) Appl. No.: 12/244,659

(22) Filed: Oct. 2, 2008

(65) Prior Publication Data

US 2009/0097252 A1   Apr. 16, 2009

(30) Foreign Application Priority Data

Oct. 11, 2007   (TW) .............................. 96138082 A

(51) Int. Cl.
*F21V 21/30* (2006.01)
*F21V 33/00* (2006.01)
*G09F 13/12* (2006.01)

(52) U.S. Cl. ...................... 362/269; 362/140; 362/141; 362/234; 40/219; 40/553

(58) Field of Classification Search ................ 362/269, 362/135–144, 427, 220, 559–560, 125, 128, 362/311.11, 449, 418, 319, 296.09, 234, 362/253; 40/219, 553

See application file for complete search history.

(56) References Cited

U.S. PATENT DOCUMENTS

| | | | | |
|---|---|---|---|---|
| 2,918,670 | A * | 12/1959 | Cusano et al. | 348/834 |
| 3,215,776 | A * | 11/1965 | Hamilton | 348/834 |
| 3,885,095 | A * | 5/1975 | Wolfson et al. | 348/115 |
| 4,395,010 | A * | 7/1983 | Helgeland et al. | 248/371 |
| 4,561,044 | A * | 12/1985 | Ogura et al. | 362/84 |
| 4,630,904 | A * | 12/1986 | Pastore | 359/636 |
| 4,831,307 | A * | 5/1989 | Takenaka et al. | 313/478 |
| 5,365,378 | A * | 11/1994 | Sorko-Ram | 359/839 |
| 5,432,504 | A * | 7/1995 | Shaw et al. | 340/815.73 |
| 5,453,915 | A * | 9/1995 | Bradley, III | 362/144 |
| 5,575,552 | A * | 11/1996 | Faloon et al. | 362/492 |
| 6,273,585 | B1 * | 8/2001 | Wu | 362/135 |
| 7,048,406 | B1 * | 5/2006 | Shih | 362/135 |
| 7,168,830 | B2 * | 1/2007 | Pastrick et al. | 362/494 |
| 7,287,737 | B2 * | 10/2007 | Rossi | 248/475.1 |

* cited by examiner

*Primary Examiner*—Alan Cariaso

(57) ABSTRACT

A display with illumination function, comprising: a display body, including a display screen; a support, have a top and a base, said top includes at least one of the pivot member joint to one side of display body allow the display body to rotate freely; a light source disposed around the display screen; and a stand connected to the base of the support. When the surrounding environment has insufficient lighting for reading or using the display, the user can simply turn on the light source to illuminates the display screen and work area, without the needs of additional lamps or other lighting devices which can occupy extra desk space.

18 Claims, 4 Drawing Sheets

DISPLAY FOR AN ELECTRONIC DEVICE WITH ADDITIONAL ILLUMNATION FUNCTION

CROSS-REFERENCES TO RELATED APPLICATION

This non-provisional application claims priority under 35 U.S.C. §119(a) on Patent Application No(s). 96138082 filed in Taiwan, R.O.C. on Oct. 11, 2007, the entire contents of which are hereby incorporated by reference.

BACKGROUND OF THE INVENTION

1. Field of the Invention

The present invention relates to a display, and more particularly to a display with illumination function.

2. Description of the Related Art

With the rapid development in technologies, quality of human life has improved consequently, therefore displays are more and more widely used. The conventional bulky size and high radiation Cathode Ray Tube (CRT) displays have been gradually replaced by today's light weight and thin liquid crystal displays (LCDs). Traditional displays only have the function of displaying images on the screen, and with simple adjustment of the display screen brightness and contrast. However, sometimes the surrounding environment may not always provide a suitable work area and often has insufficient lighting for reading or using the display, thus it is necessary to have additional lamps and other lighting devices. Extra lamp or other lighting devices have the problem of occupying the work space or desk space. In addition, when the display is not in operate, the display screen only showing a black screen, with no any other features.

SUMMARY OF THE INVENTION

According, it is a primary object of the present invention to provide a display with illumination function. The display with illumination function comprises a display body, a support, a light source and a stand. The display body includes a display screen; the support having a top and a base, the top includes at least one pivot member jointed to one side of the display body allowing the display body to rotate freely; the light source disposed around the display screen; and the stand connected to the base of the support.

The present invention, a display with light source surrounding the display screen, provides illumination for the display and the surrounding work area when surrounding environment has insufficient lighting. Not requiring additional lamps and other lighting devices which save the desk space.

The display with illumination function as recited above, wherein the display screen has a surface which includes a layer of backlight film. When the display is turned on, the backlight film operates normally and permits backlight passing through the display screen. However, when the display is turned off, the backlight film thereby reflects surrounding light and function as a mirror.

Furthermore, the present invention, a display with illumination function comprises a display body, a support, a light source and a stand. The display body includes a display screen; the support having a Y-shaped top and a base, the Y-shaped top includes two pivot members on each side jointed to two sides of the display body allowing the display body to rotate freely within the Y-shaped top; the light source disposed around the display screen; and the stand connected to the base of the support.

In addition, the display with illumination function as recited above, wherein the Y-shaped top can accommodate the display body, therefore the display body can rotate freely in the Y-shaped top.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
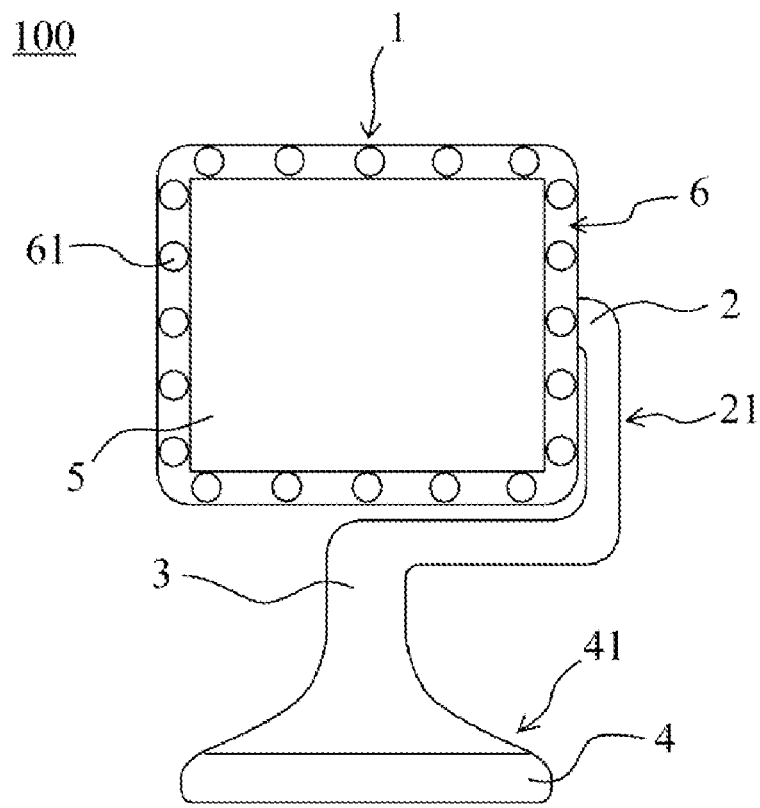
FIG. 1 is a front view of the present invention.

Referring to FIG. 1, shows the prefer embodiment of the present invention, a display 100 with illumination function, comprises: a display body 1 including a display screen 5; a support 3 having a top 21 and a base 41, the top 21 includes at least one pivot member 2 jointed to one side of display body 1 (FIG. 1 showing a single pivot joint) allowing the display body 1 to rotate freely; a light source 6 comprising plurality of light sources 61 disposed around a perimeter of the display screen 5; and a stand 4 connected to the base 41 of the support 3. When the surrounding environment has insufficient lighting for reading or using the display, the user can simply turn on the light source 6 to illuminates the display screen 5 and work area, without the needs of additional lamps or other lighting devices which can occupy extra desk space.

Figure 4:
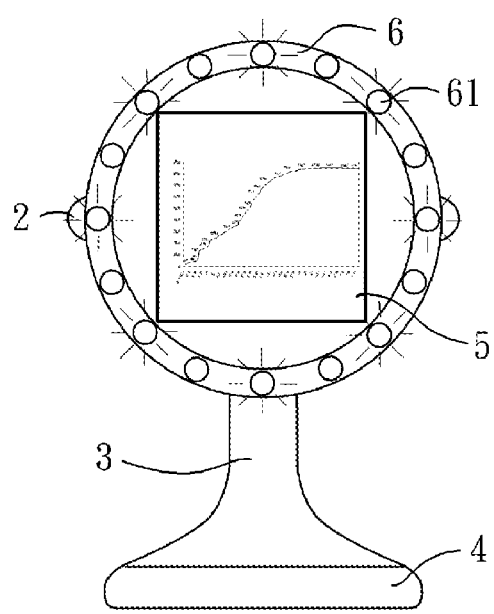
FIG. 4 is a front view of a display with illumination function in accordance with another embodiment of the present invention in use.
Figure 5:
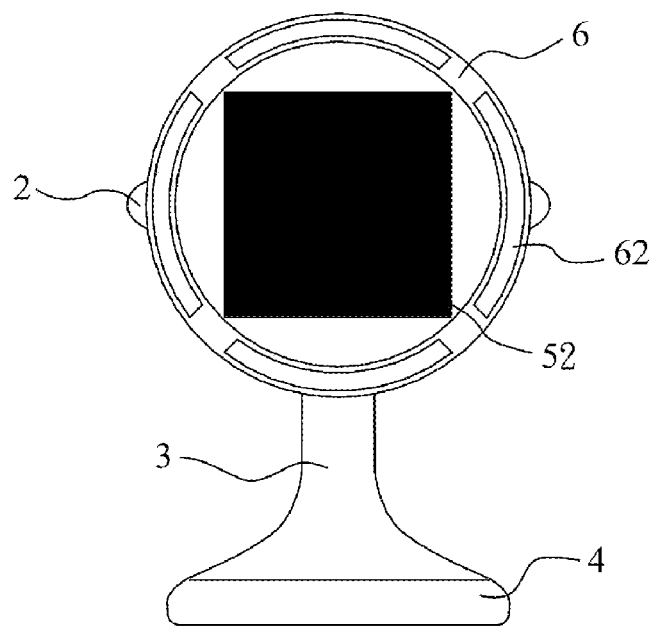
FIG. 5 is a front view of a display with illumination function in accordance with another embodiment of the present invention not in use display screen function as a mirror.

The light source 6 can be any of variety of sources such as a plurality of point light sources 61 or a plurality of tube light sources 62 disposed around a perimeter of the display screen as shown in FIG. 5. The light source 6 provides indirect lighting in front of the display screen 5 and surrounding work area as shown in FIG. 4 and FIG. 5. The illustrated point light source 61 or tube light source 62 can be made of light-emitting diode (LED), halogen light bulb or fluorescent light bulb and does not limit the applicability of the invention. Furthermore, the plurality of point light sources 61 or plurality of tube light sources 62 can be different colors according to different illuminate designs allowing the user to choose the colors they prefer.

The light source 6 can be controlled by an on-off switch or touch sensor switch (not shown) on the display body 1 or through On Screen Display menu (OSD) to activate light source 6 on and off.

The display 100 with illumination function can be a liquid crystal display (LCD) television, a plasma display panel (PDP) television, or an organic light emission diode (OLED) television.

Figure 2:
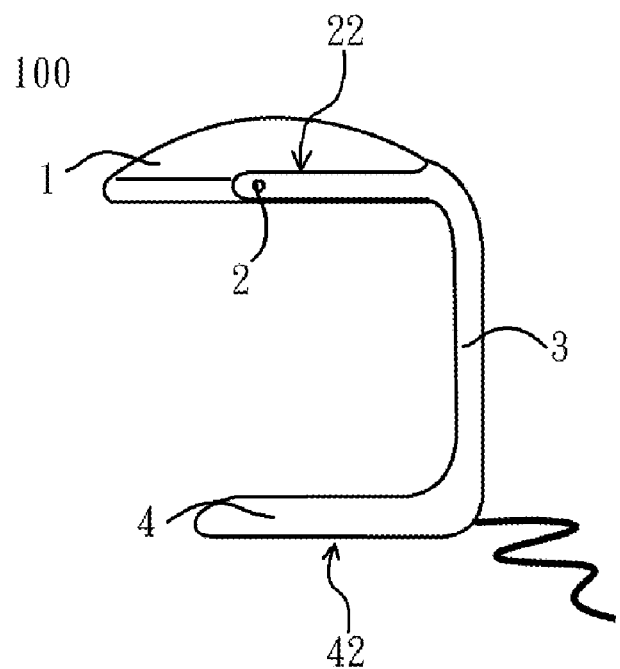
FIG. 2 is a side view of a display with illumination function in accordance with another embodiment of the present invention.
Figure 3:
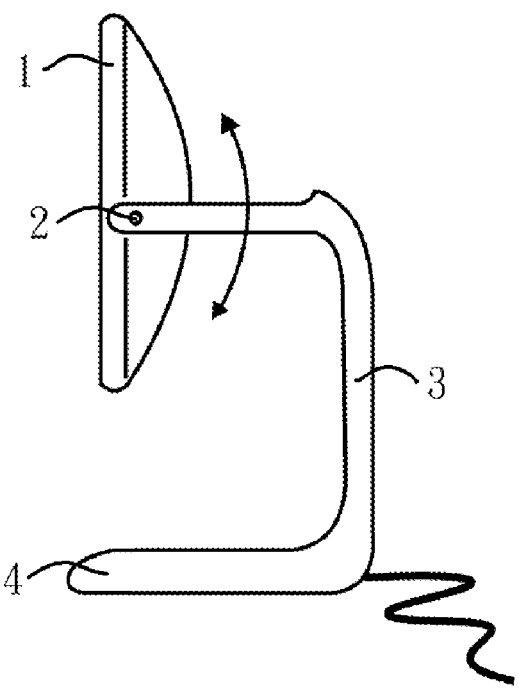
FIG. 3 is a side view of a display with illumination function in accordance with another embodiment of the present invention in an operational position.

In an alternative embodiment, as shown in FIG. 2 and FIG. 3, the display 100 with illumination function, comprises: a display body 1 including a display screen 5; a support 3 having a Y-shaped top 22 and a base 42, the Y-shaped top 22 includes two pivot members 2 on each side jointed to two sides of the display body 1 allowing the display body 1 to rotate freely within the Y-shaped top 22 but not limit to the applicability of the invention; a light source 6 disposed around the display screen 5; and a stand 4 connected to the base 42 of the support 3. When the surrounding environment has insufficient lighting for reading or using the display, the user can simply turn on the light source 6 to illuminates the display screen 5 and work area, without the needs of additional lamps or other lighting devices which can occupy extra desk space.

The light source 6 can be any of variety of sources such as a plurality of point light sources 61 or a plurality of tube light sources 62 disposed around a perimeter of the display screen as shown in FIG. 5. The light source 6 provides indirect lighting in front of the display screen 5 and surrounding work area as shown in FIG. 4 and FIG. 5. The illustrated point light source 61 or tube light source 62 can be made of light-emitting diode (LED), halogen light bulb or fluorescent light bulb and does not limit the applicability of the invention. Furthermore, the plurality of point light sources 61 or plurality of tube light sources 62 can be different colors according to different illuminate designs allowing the user to choose the colors they prefer.

The light source 6 can be controlled by an on-off switch (not shown) on the display body 1 or through the On Screen Display menu (OSD) to turn light source 6 on and off.

The display 100 with illumination function can be a liquid crystal display (LCD) television, a plasma display panel (PDP) television, or an organic light emission diode (OLED) television.

As shown in FIG. 3, the present invention is a liquid crystal display (LCD), it utilizes the pivot member 2 and support 3 allowing the user to adjust the display screen's 5 viewing angle of the display body 1 or to adjust the illuminated angle of the light source 6.

Figure 8:
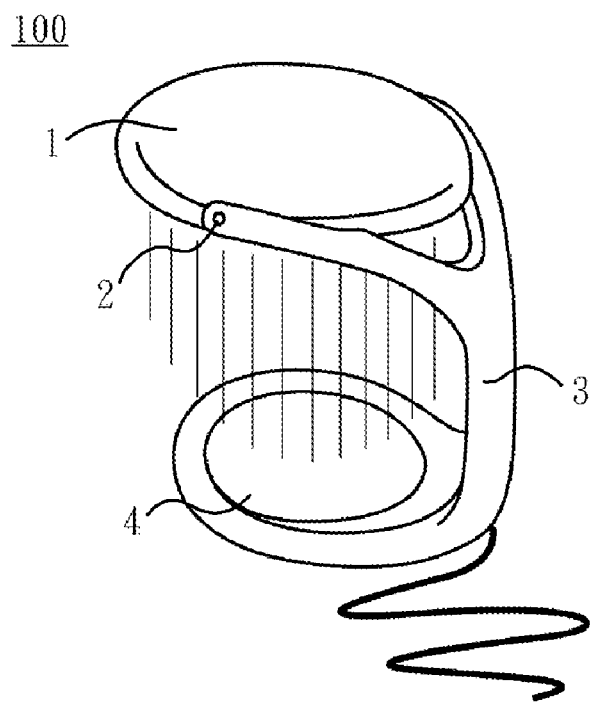
FIG. 8 is a perspective view of a display with illumination function in accordance with another embodiment of the present invention function as a lamp.

Referring to FIG. 8, when the display is not in use the user, can rotate the display body 1 into horizontal position which can turn into a desk lamp, for when reading or writing at the same time effectively saving the desk space.

Figure 6:
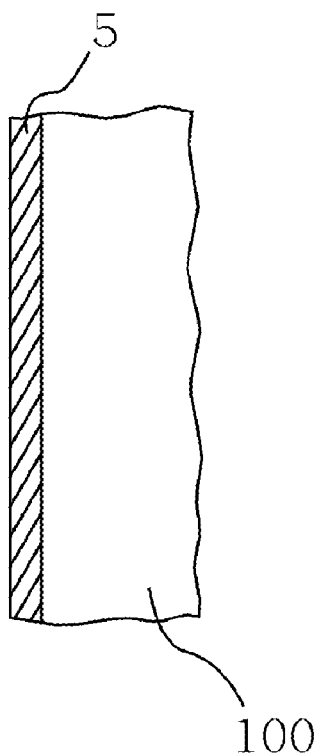
FIG. 6 is a cross-sectional view of a traditional display screen.
Figure 7:
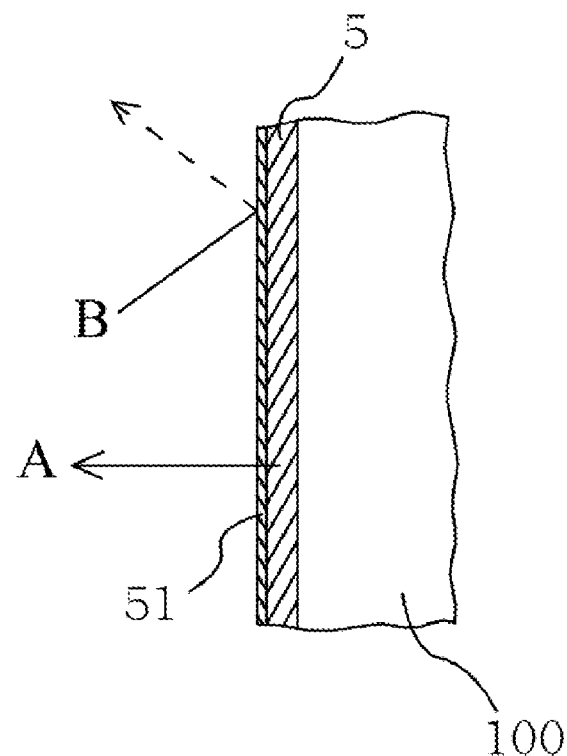
FIG. 7 is a cross-sectional view of a display screen of the present invention.

FIG. 6 is a cross-sectional view of a traditional display screen and FIG. 7 is a cross-sectional view of a display screen of the present invention. As shown in FIG. 6, the traditional display screen 5 is only a transparent glass, without any surface treatment. Therefore, when the display is not in operate, the display screen 5 only showing a black screen, with no any other features. However, in the present invention, the surface of the display screen 5 includes a layer of backlight film 51, the backlight film 51 is treated with mirror finish which allows light A pass through the display screen 5 and reflects the external light B off the backlight film 51. Therefore, when the display screen 5 is in operated, it permits backlight showing the images as shown in FIG. 4. When the display screen 5 is turned off, no backlight is showing, the external light B is reflects off backlight film 51 and creating a mirror image 52 as shown in FIG. 5. The mirror finish can also be coated by spray coating or by electroplating, both practices are well know in the backlight treatment field therefore will not be discuss further.

Various modifications in structure and/or function may be to the disclosed embodiments by one skilled in the art without departing from the scope of the invention as defined by the claims.

What is claimed is:

1. A display for an electronic device with additional illumination function comprising:
   a display body including a display screen arranged to display images generated by the electronic device to a user;
   a support having a top and a base, the top including at least one pivot member jointed to one side of the display body allowing the display body to rotate freely;
   a plurality of light sources disposed on an exterior perimeter of the display screen in a symmetrical arrangement surrounding the display screen; and
   a stand connected to the base of the support,
   wherein the display screen has an exterior surface, the exterior surface including a layer of backlight film; and
   wherein the backlight film is treated with mirror finish arranged to permit backlight to pass through the display screen toward the user when the display is turned on and reflect external light off the backlight film creating a mirror image when the display is turned off.

2. The display with additional illumination function as in claim 1, wherein each of the plurality of light sources is a point light source.

3. The display with additional illumination function as in claim 1, wherein each of the plurality of light sources is a tube light source.

4. The display with additional illumination function as in claim 2, wherein the point light source is a light-emitting diode, halogen light bulb or fluorescent light bulb.

5. The display with additional illumination function as in claim 3, wherein the tube light source is a light-emitting diode, halogen light bulb or fluorescent light bulb.

6. The display with additional illumination function as in claim 1, wherein the display screen is a liquid crystal display, a plasma display panel, or an organic light emission diode.

7. The display with additional illumination function as in claim 1, the mirror finish is coated by spray coating.

8. The display with additional illumination function as in claim 1, the mirror finish is coated by electroplating.

9. The display with additional illumination function as in claim 1, wherein the plurality of light sources is in addition to a source of illumination for the display screen for displaying images of the electronic device.

10. A display for an electronic device with additional illumination function comprising:
    a display body including a display screen arranged to display images generated by the electronic device to a user;
    a support having a Y-shaped top and a base, the Y-shaped top including two pivot members on each side jointed to two sides of the display body allowing the display body to rotate freely within the Y-shaped top;
    a plurality of light sources disposed on an exterior perimeter of the display screen in a symmetrical arrangement surrounding the display screen; and
    a stand connected to the base of the support,
    wherein the display screen has an exterior surface, the exterior surface including a layer of backlight film; and wherein the backlight film is treated with mirror finish arranged to permit backlight to pass through the display screen toward the user when the display is turned on and reflect external light off the backlight film creating a mirror image when the display is turned off.

11. The display with additional illumination function as in claim 10, wherein each of the plurality of light sources is a point light source.

12. The display with additional illumination function as in claim 10, wherein each of the plurality of light sources is a tube light source.

13. The display with additional illumination function as in claim 11, wherein the point light source is a light-emitting diode, halogen light bulb or fluorescent light bulb.

14. The display with additional illumination function as in claim 12, wherein the tube light source is a light-emitting diode, halogen light bulb or fluorescent light bulb.

15. The display with additional illumination function as in claim 10, wherein the display screen is a liquid crystal display, a plasma display panel, or an organic light emission diode.

16. The display with additional illumination function as in claim 10, the mirror finish is coated by spray coating.

17. The display with additional illumination function as in claim 10, the mirror finish is coated by electroplating.

18. The display with additional illumination function as in claim 10, wherein the plurality of light sources is in addition to a source of illumination for the display screen for displaying images of the electronic device.

* * * * *